(12) United States Patent
Hirai et al.

(10) Patent No.: US 12,461,334 B2
(45) Date of Patent: Nov. 4, 2025

(54) LENS BARREL, LENS APPARATUS AND IMAGE PICKUP APPARATUS

(71) Applicant: CANON KABUSHIKI KAISHA, Tokyo (JP)

(72) Inventors: Yuusuke Hirai, Saitama (JP); Akira Yokoyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 658 days.

(21) Appl. No.: 17/665,752

(22) Filed: Feb. 7, 2022

(65) Prior Publication Data
US 2022/0269039 A1 Aug. 25, 2022

(30) Foreign Application Priority Data
Feb. 19, 2021 (JP) ................................ 2021-024938

(51) Int. Cl.
*G02B 7/10* (2021.01)
*G03B 17/14* (2021.01)
*H04N 23/55* (2023.01)

(52) U.S. Cl.
CPC .............. *G02B 7/10* (2013.01); *G03B 17/14* (2013.01); *G03B 2205/0046* (2013.01); *H04N 23/55* (2023.01)

(58) Field of Classification Search
CPC . G02B 7/04; G02B 7/10; G02B 7/102; G03B 2205/0053; G03B 2205/0046

(Continued)

(56) References Cited

U.S. PATENT DOCUMENTS 5,528,430 A * 6/1996 Hamasaki ................ G02B 7/04
359/701
5,561,564 A * 10/1996 Nakamura ............ G02B 7/102
396/85

(Continued)

FOREIGN PATENT DOCUMENTS

GB 1573640 A * 8/1980 ............. G02B 15/00
JP 2006276219 A 10/2006

(Continued)

OTHER PUBLICATIONS

Machine translation of JP-2014160120-A retrieved electronically from Espacenet Aug. 26, 2024 (Year: 2024).*

(Continued)

*Primary Examiner* — Cara E Rakowski
(74) *Attorney, Agent, or Firm* — ROSSI, KIMMS & McDOWELL LLP (57) ABSTRACT

A lens barrel including: a linear guide member with a linear guide extending along an optical axis formed therein; a cam member with a cam formed therein; and a moving member, holding an optical element, including an engaging member engaging with the linear guide and the cam, and moving along the optical axis by a relative rotation between the linear guide member and the cam member, wherein the engaging member includes a first engaging member engaging with the cam, and a second engaging member engaging with the linear guide and having a plane in contact with the linear guide, wherein an amount of backlash between the first engaging member and the cam is smaller than an amount of backlash between the second engaging member and the linear guide, and wherein the lens barrel includes a viscous member arranged between the linear guide and the second engaging member.

10 Claims, 8 Drawing Sheets

(58) Field of Classification Search
USPC .......................................................... 350/701
See application file for complete search history.

(56) References Cited

U.S. PATENT DOCUMENTS

| | | | | |
|---|---|---|---|---|
| 2010/0214679 A1* | 8/2010 | Iikawa | ..................... | G02B 7/10 |
| | | | | 359/825 |
| 2014/0204471 A1* | 7/2014 | Uno | ......................... | G03B 5/00 |
| | | | | 359/700 |
| 2017/0059809 A1* | 3/2017 | Yokoyama | ............... | G02B 7/04 |
| 2020/0200240 A1* | 6/2020 | Kondo | ................... | G02B 7/021 |

FOREIGN PATENT DOCUMENTS

| | | | | | |
|---|---|---|---|---|---|
| JP | 2012058459 | A | | 3/2012 | |
| JP | 2014160120 | A | * | 9/2014 | ............. G02B 7/10 |
| JP | 2015028546 | A | | 2/2015 | |
| JP | 2016170204 | A | | 9/2016 | |
| JP | 2019053145 | A | | 4/2019 | |
| WO | 2012132780 | A1 | | 10/2012 | |

OTHER PUBLICATIONS

Sanya Mathura "Oil Viscosity: A Practical Guide" Precision Lubrication retrieved electronically from the wayback machine, published Apr. 6, 2023 (Year: 2023).*

Machine translation of JP2015028546 retrieved electronically from Espacenet Dec. 31, 2024 (Year: 2024).*

* cited by examiner

LENS BARREL, LENS APPARATUS AND IMAGE PICKUP APPARATUS

BACKGROUND OF THE INVENTION

Field of the Invention

The present invention relates to a lens barrel, a lens apparatus, and an image pickup apparatus.

Description of the Related Art

In a mechanism (lens barrel) for moving a lens unit in an optical axis direction by a cam and a cam follower, a dent by the cam follower can be generated in a cam groove when an impact is applied. In order to suppress the impact, there is known a structure in which a flat portion is provided on the cam follower to increase the contact area between the cam follower and the cam groove, thereby reducing the contact surface pressure. Further, there is known a structure in which a coil spring is provided between the cam groove and the cam follower to suppress backlash between the cam groove and the cam follower (Japanese Patent Application Laid-Open No. 2019-53145).

In the structure disclosed in Japanese Patent Application Laid-Open No. 2019-53145, a vibration caused by the play between the cam follower and the groove may not be sufficiently reduced. For example, when the spring force is insufficient for a force acting on the cam follower, the lens unit vibrates and an image formed by the lens unit shakes.

SUMMARY OF THE INVENTION

An aspect of the disclosure provides, for example, a lens barrel beneficial in a movement of an optical element.

An aspect of the disclosure provides a lens barrel includes: a linear guide member with a linear guide extending along an optical axis formed therein; a cam member with a cam formed therein; and a moving member, holding an optical element, including an engaging member engaging with the linear guide and the cam, and moving along the optical axis by a relative rotation between the linear guide member and the cam member, wherein the engaging member includes a first engaging member engaging with the cam, and a second engaging member engaging with the linear guide and having a plane in contact with the linear guide, wherein an amount of backlash between the first engaging member and the cam is smaller than an amount of backlash between the second engaging member and the linear guide, and wherein the lens barrel includes a viscous member arranged between the linear guide and the second engaging member.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

Embodiment 1

Figure 1:
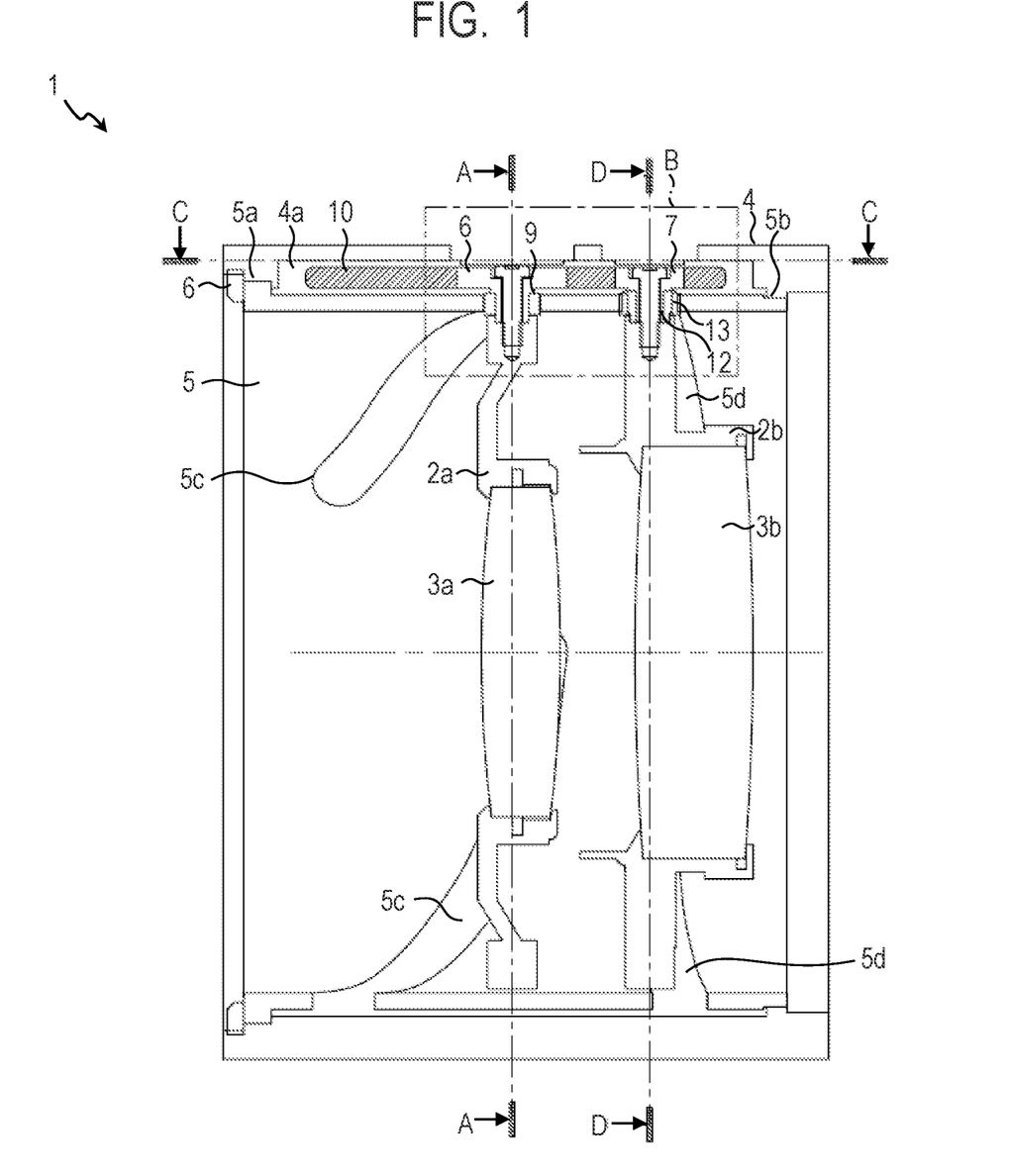
FIG. 1 is a cross-sectional view of a lens barrel of Embodiments 1 and 2 of the present invention.

The lens barrel 1 according to the first embodiment of the present invention will now be described with reference to FIGS. 1 to 4. FIG. 1 shows a general view of the lens barrel 1 in this embodiment.

The lens barrel 1 of this embodiment has a mechanism in which moving lens barrels (moving members) 2a and 2b having two zoom moving lens units are moved in the optical axis direction by using a so-called cam mechanism, and the user varies the optical magnification. Hereinafter, the case where the first embodiment is applied to the moving lens barrel 2a and the second embodiment is applied to the moving lens barrel 2b will be described for convenience.

Referring to FIG. 1, the lens barrel 1 is provided with a plurality of lenses (optical elements) 3a and 3b. The lens 3a has a convex shape, and is fixed to the moving lens barrel 2a by a lens holding structure such as a pressing ring or caulking (not shown). Similarly, the lens 3b has a convex shape and is fixed to the moving lens barrel 2b by a lens holding structure such as a pressing ring or caulking (not shown).

Referring to FIG. 1, the lens barrel 1 is provided with a fixed lens barrel (linear guide member) 4, a cam ring (cam member) 5, three straight groove cam followers (second engaging members) 6 for displacing the moving lens barrel 2a in the optical axis direction, and three straight groove cam followers (second engaging members) 7 for displacing the moving lens barrel 2b in the optical axis direction.

Figure 2:
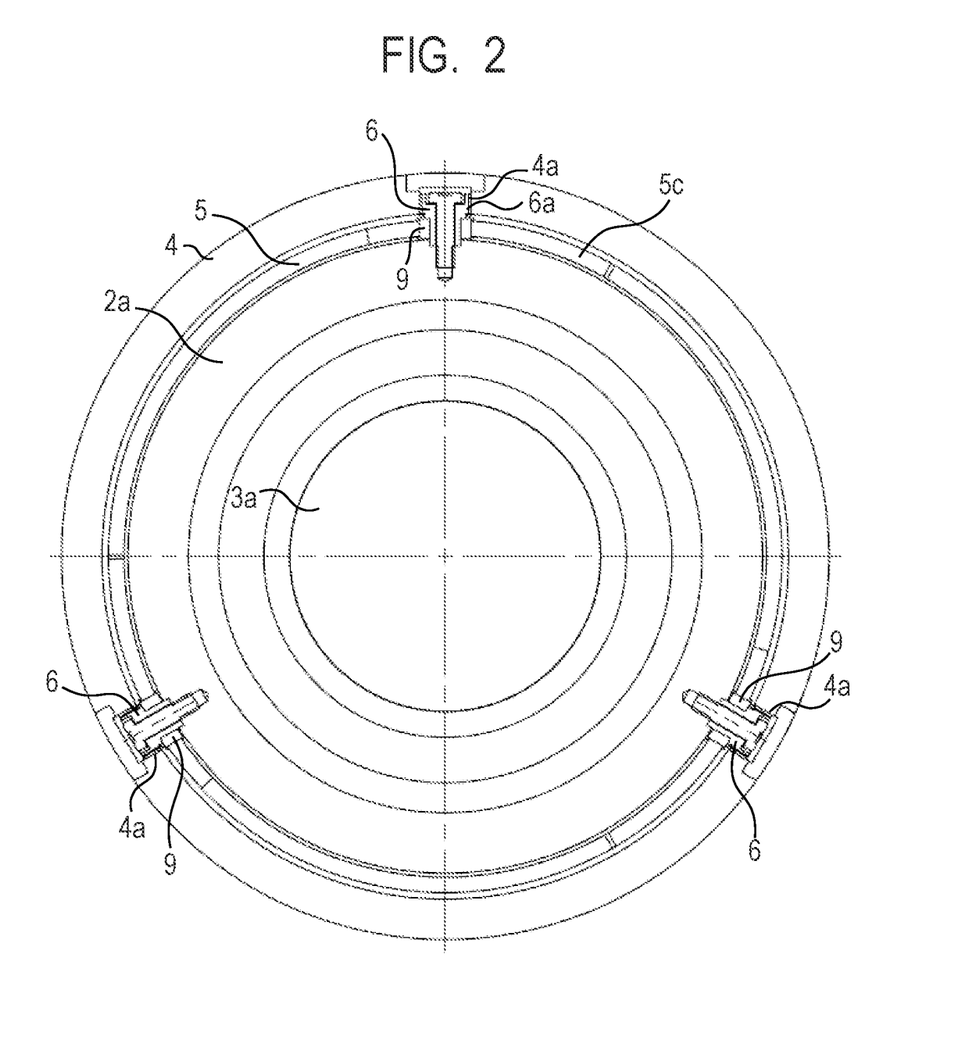
FIG. 2 is a cross-sectional view taken along line A-A of FIG. 1 of Embodiment 1 of the present invention.
Figure 4:
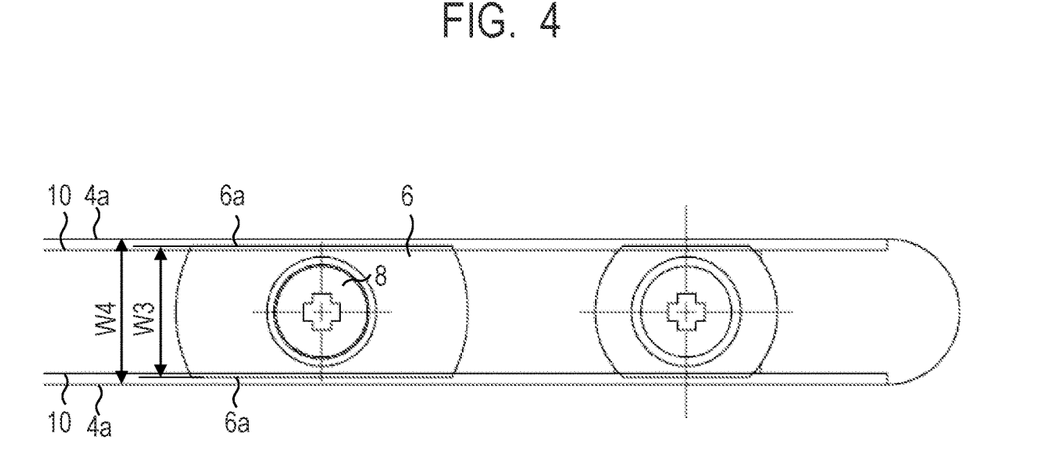
FIG. 4 is a cross-sectional view taken along line C-C of FIG. 1 of Embodiments 1 and 2 of the present invention.

As shown in FIGS. 1, 2, and 4, the fixed lens barrel 4 is provided with straight grooves (linear guides) 4a extending in parallel with the optical axis direction at three locations approximately equally apart from each other at 120 degree intervals around the optical axis. The straight grooves 4a are provided in non-penetrating or penetrating manner in a direction perpendicular to the optical axis. In the embodiments, the straight grooves 4a are of a non-penetrating type.

As shown in FIG. 1, the cam ring 5 has a substantially a cylindrical shape, and the sliding surface 5a and the sliding surface 5b of the outer peripheral surface of the cam ring 5 slide against the inner peripheral surface of the fixed lens barrel 4. The cam ring 5 is restricted from moving in the optical axis direction by a fixed lens barrel 4 and a pressing ring fixed to the fixed lens barrel 4 by a screw. Thus, the cam ring 5 can be rotated around the optical axis. Further, although the cam ring 5 having an approximately cylindrical shape is exemplified as the cam follower in the present embodiment, the shape of the cam follower is not limited to an approximately cylindrical shape, and may be an elliptical shape or a shape having a flat portion in contact with the cam groove. However, since the extending direction of the cam groove 5c with respect to the optical axis direction in the engaging portion of the cam follower changes, the cam follower is fixed rotatably around the screw (holding member) 8 when the shape of the cam follower in the cross section whose normal is vertical to the optical axis is not circle.

The cam ring 5 is provided with three cam grooves (cams) 5c having the same shape for moving the moving lens barrel 2a and three cam grooves 5d having the same shape for moving the moving lens barrel 2b. The cam groove 5c and the cam groove 5d are provided at three locations approximately equally apart from each other around the optical axis. The moving lens barrel holding the optical element moves along the optical axis by relative rotation between the fixed lens barrel and the cam ring by engaging the cam follower with the linear groove and the cam groove.

Next, the structure around the straight groove cam follower 6 will be described with reference to FIGS. 2 to 4.

As shown in FIG. 4, the straight groove cam follower 6 has a D-cut portion 6a which is a plane including a portion that makes a surface contact (plane contact) to the wall surface (wall plane) of the straight groove 4a, and slides against the wall surface of the straight groove 4a while making a surface contact thereto.

Figure 3:
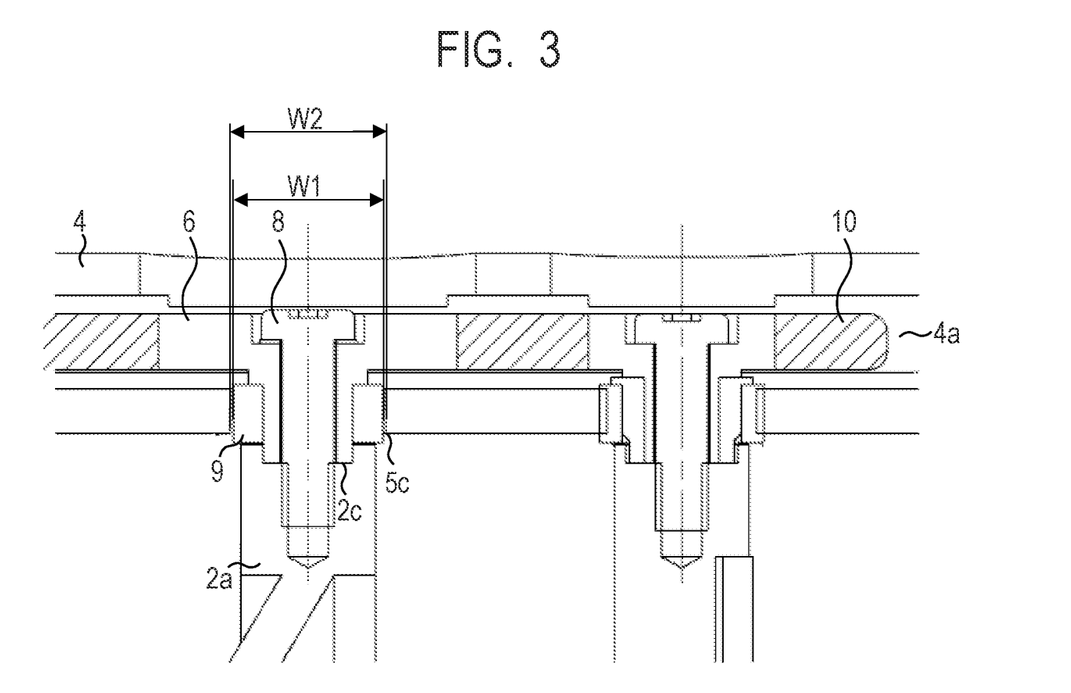
FIG. 3 shows a detailed view B of FIG. 1 of Embodiments 1 and 2 of the present invention.

Referring to FIG. 3, the straight groove cam follower 6 abuts on a seat surface 2c provided on the moving lens barrel 2a, and is fixed to the moving lens barrel 2a by a screw (holding member) 8. A curved groove cam follower (first engaging member) 9 is provided between the D-cut portion 6a of the straight groove cam follower 6 and the seat surface 2c.

As shown in FIG. 3, the curved groove cam follower 9 has a cylindrical shape, the inner peripheral surface thereof is fitted to the straight groove cam follower 6, and the outer peripheral surface thereof is brought into sliding contact with the cam groove 5c. The curved groove cam follower 9 is constituted by a material including a material different from that of the fixed lens barrel 4, the cam ring 5 and the straight groove cam follower 6. The material of the curved groove cam follower 9 is resin, rubber or the like, whose deformation amount at the time of compression is larger than that of the material of the fixed lens barrel 4, the cam ring 5 or the straight groove cam follower 6. The member, in contact with the cam groove 5c, of the curved groove cam follower 9 is preferably less rigidity than the member constituting the fixed lens barrel 4, the cam ring 5 (cam groove) or the straight groove cam follower 6.

As shown in FIG. 3, there is a clearance S (S=|W2−W1|) between the width (diameter) W1 of the curved groove cam follower 9 and the width W2 of the cam groove 5c. As shown in FIG. 4, there is a clearance T (T=|W4−W3|) between the width W3 of the straight groove cam follower 6 and the width W4 of the straight groove 4a. The clearance amounts S and T satisfy the following inequality.

$$S < T \text{ (That is, } |W2 - W1| < |W4 - W3|\text{)}$$

The curved groove cam follower 9 may be press-fitted into the cam groove 5c, but in this case, the gap amount S becomes zero. In the configuration shown in FIG. 3, the clearance amount is 0 mm≤S<T.

The position of the moving lens barrel 2b in the optical axis direction is determined by engaging the cam groove 5c with the curved groove cam follower 9. Further, the straight groove cam follower 6 and the straight groove 4a are engaged with each other to secure the linearity of the movement of the moving lens barrel 2b in the optical axis direction. Further, by providing at least one D-cut portion 6a (planar portion) of the straight groove cam follower 6 sliding against the wall surface of the straight groove 4a, a face tilt of the optical surface is suppressed. Since it is required to arrange the position of the moving lens barrel 2b in the optical axis direction more precisely so as to control the optical performance with high accuracy, the play between the cam groove 5c and the curved groove cam follower 9 is designed with higher priority to the play between the straight groove cam follower 6 and the straight groove 4a. The play between the straight groove cam follower 6 and the straight groove 4a is designed to absorb manufacturing errors. Therefore, S<T should be secured as described above.

On the sliding surface of the straight groove 4a with respect to the straight groove cam follower 6, grease or lubricating oil is applied to form a viscous film (viscous member) 10.

As shown in FIG. 3, the curved groove cam follower 9 is in sliding contact with the cam groove 5c, and the straight groove cam follower 6 is in sliding contact with the straight groove 4a via the viscous film 10. Thus, when the cam ring 5 rotates, the moving lens barrel 2a moves in the optical axis direction, and the optical state of the lens barrel 1 changes.

Since the movement of the moving lens barrel 2a in the optical axis direction is the movement of the straight groove cam follower 6 and the straight groove 4a through the viscous resistance of the viscous film 10, free movement is restricted even though there is play between the curved groove cam follower 9 and the cam groove 5c. Therefore, hunting of the control can be suppressed. Further, even if the sliding area between the straight groove cam follower 6 and the straight groove 4a is large, the increase in the sliding resistance can be suppressed, and the wear of the sliding surface can also be suppressed.

As described above, the effect of Embodiment 1 is to suppress backlash by providing the viscous film 10 between the straight groove cam follower 6 and the straight groove 4a. Further, by designing the play between the curved groove cam follower 9 and the cam groove 5c to be minimum, the movement of the moving lens barrel 2a is stabilized so that the swinging of the image can be reduced.

Further, as compared with the prior art, there is no need to constitute a spring in the cam follower portion, and only a lubricant such as grease or lubricating oil is applied to the straight groove, the ease of assembly becomes easy and the number of parts is reduced. When the mass of the moving group becomes heavy, it is only necessary to reduce backlash amount or to change the viscosity of the lubricant forming the viscous film, so that a correspondence with a high degree of freedom is possible.

Embodiment 2

A lens barrel 1 according to Embodiment 2 of the present invention will be described below with reference to FIGS. 1 and 5 to 7. The cam follower portion has a different structure from that of the first embodiment.

The structure around the straight groove cam follower 7 will be described with reference to FIGS. 5 and 6.

Figure 6:
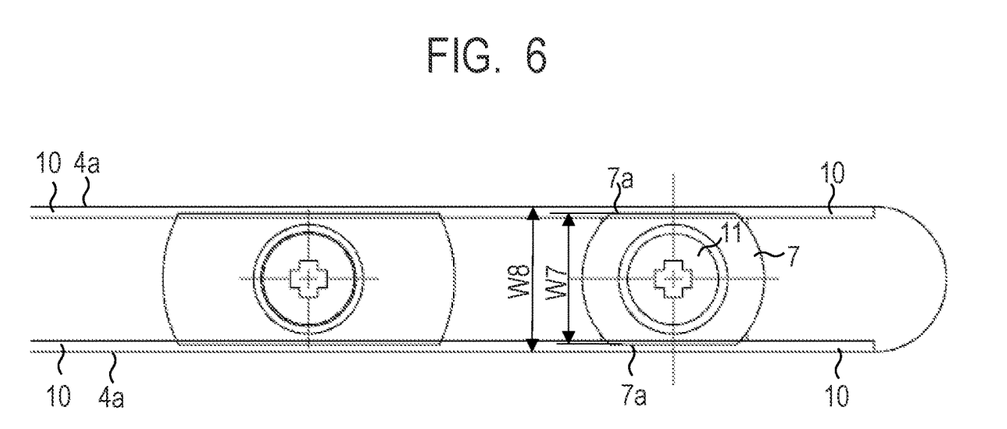
FIG. 6 is a cross-sectional view taken along line C-C of FIG. 1 of Embodiment 2 of the present invention.

As shown in FIG. 6, the straight groove cam follower 7 has D-cut portion 7a substantially parallel to the straight groove 4a, and slides with a surface contact (plane contact) with respect to the straight groove 4a.

Figure 5:
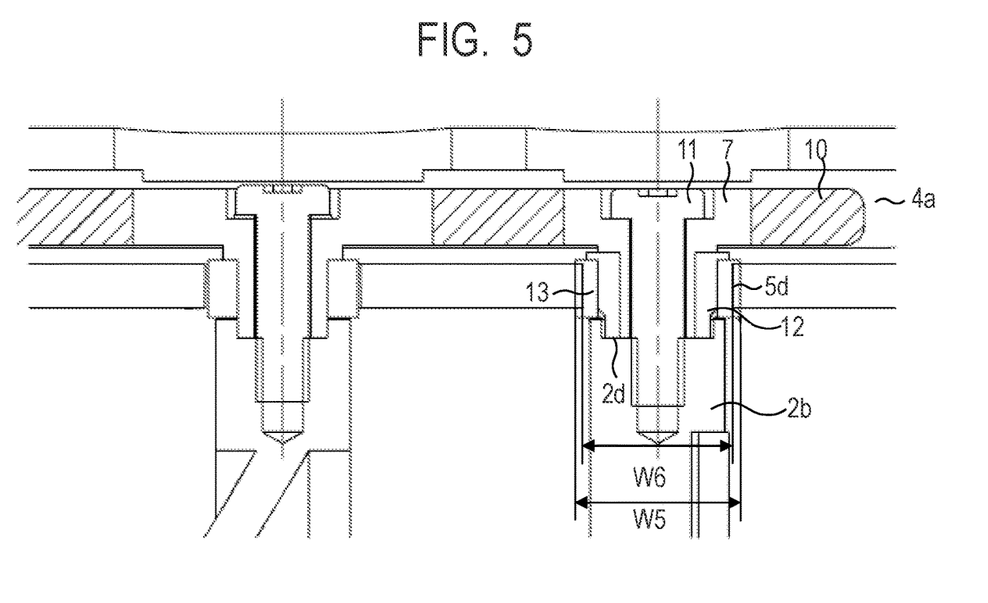
FIG. 5 shows a detailed view B of FIG. 1 of Embodiment 2 of the present invention.

As shown in FIG. 5, the straight groove cam follower 7 abuts on a seat surface 2d provided on the moving lens barrel 2b, and is fixed by a screw (holding member) 11. An intermediate member 12 and a curved groove cam follower 13 are provided between D-cut portion 7a of the straight groove cam follower 7 and the seat surface 2d. The intermediate member 12 has a cylindrical shape, and the inner peripheral surface is fitted to the straight groove cam follower 7, and the outer peripheral surface is fitted or press-fitted to the curved groove cam follower 13. The curved groove cam follower 13 has a cylindrical shape, and its outer peripheral surface is slidably brought into contact with the cam groove 5d.

The curved groove cam follower 13 is made of resin, rubber, or the like, and the deformation amount at the time of compression is larger than that of the fixed lens barrel 4, the cam ring 5, and the straight groove cam follower 7. That is, the curved groove cam follower 13 is less rigid (less stiff) than the fixed lens barrel 4, the cam ring 5, and the straight groove cam follower 7. The materials of the intermediate member 12 and the cam groove 5c are metallic materials such as aluminum, magnesium, brass or the like whose linear expansion coefficients are close to each other.

There is a clearance of a clearance amount Q (|W6−W5..) between the width (diameter) W5 of the curved groove cam follower 13 and the width W6 of the cam groove 5d. There is a clearance of a clearance amount R (|W8−W7|) between the width W7 of the straight groove cam follower 7 and the width W8 of the straight groove 4a shown in FIG. 6. The relationship between the gap amounts Q and R is Q<R. The curved groove cam follower 13 may be press-fitted into the cam groove 5d. In this case, the gap amount Q becomes zero. Note that in FIG. 5, for ease of understanding, the width (diameter) W5 of the curved groove cam follower 13 is indicated by the diameter of the component before being press-fitted into the cam groove 5d, and therefore does not represent the shape of the curved groove cam follower 13 in the actual assembled state. In this embodiment, since the curved groove cam follower 13 is press-fitted into the cam groove 5d and incorporated therein, the width (diameter) W5 of the curved groove cam follower 13 is equal to the width W6 of the cam groove 5d. The clearance amount is Q=0 mm, 0 mm<R (|W6−W5|=0 mm, 0 mm<|W8−W7|).

A viscous film 10 is formed on the sliding surface of the straight groove 4a with respect to the straight groove cam follower 7 by applying grease or lubricating oil. Even if the sliding area between the straight groove cam follower 7 and the straight groove 4a is large, the increase in the sliding resistance can be suppressed, and the wear of the sliding surface can also be suppressed.

Figure 7:
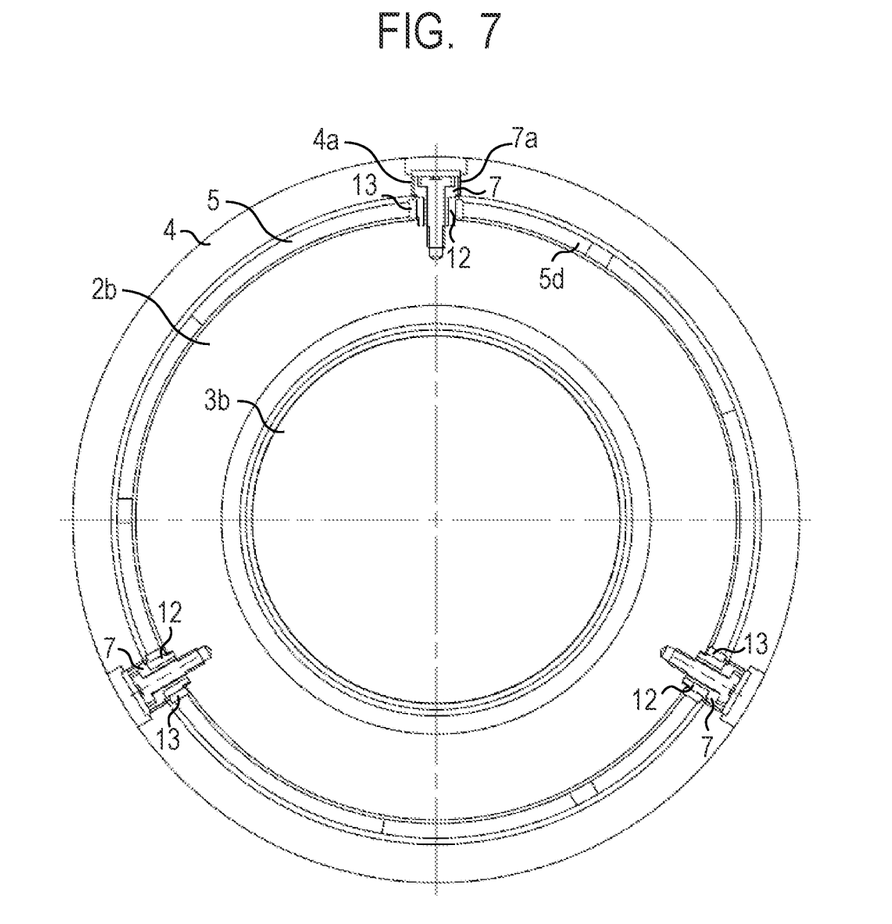
FIG. 7 shows a D-D cross-sectional view of FIG. 1 of Embodiment 2 of the present invention.

From FIGS. 5 and 7, the curved groove cam follower 13 is in sliding contact with the cam groove 5d, and the straight groove cam follower 7 is in sliding contact with the straight groove 4a via the viscous film 10. Thus, when the cam ring 5 rotates, the moving lens barrel 2b moves in the optical axis direction, and the optical state of the lens barrel 1 changes.

In Embodiment 2, by providing the intermediate member 12 in Embodiment 1, the thickness in the radial direction of the curved groove cam follower 13 is reduced. Since the curved groove cam follower 13 is different from the cam ring 5 and the straight groove cam follower 7 in material, the linear expansion coefficient is different. In this case, by reducing the thickness in the radial direction of the curved groove cam follower 13, the variation amount of the gap amount Q between the curved groove cam follower 13 and the cam groove 5d at the time of temperature change caused by the difference in the linear expansion coefficient can be reduced.

As described above, in Embodiment 2, in addition to the effect of Embodiment 1, it is possible to stabilize the movement behavior of the moving lens barrel 2a, including when the temperature changes, and thereby to reduce the swinging of the image.

Although the lens barrel 1 is described as a zoom moving lens unit in the above description, the lens barrel 1 may be applied to any cam structure constituted in a focus moving lens unit, a relay lens unit, or the like.

The relationship between the cam groove (cam) of the cam ring and the curved groove cam follower (engaging member) fixed to the moving lens barrel is exemplified in the embodiment as a configuration in which the cam having the concave structure and engaging member having the convex structure are engaged. Further, the relationship between the straight groove (linear guide) of the fixed lens barrel and the straight groove cam follower (engaging member) fixed to the moving lens barrel is exemplified as a configuration in which linear guide having the concave structure and the straight groove cam follower (engaging member) having the convex structure are engaged. However, the present invention is not limited to these configurations. A cam having a convex structure such as a rail and an engaging member having a concave structure may be engaged with each other. A linear guide having the convex structure and a straight groove cam follower (engaging member) having the concave structure may be engaged with each other. In such a configuration, the widths of the cam, engaging member, and linear guide, whether convex or concave, shall be defined as the width of the engaging portion.

Although the application of grease or lubricating oil between the cam groove 5c and the curved groove cam follower 9, and between the cam groove 5d and the curved groove cam follower 13 is not clearly described in the above description, grease or lubricating oil may be applied to slide through the viscous film (viscous member). In such case, grease or lubricating oil different from that applied to the straight groove may be applied to the cam groove. In particular, the viscosity of the lubricating oil or the like in the straight groove is preferably larger than the viscosity of the lubricating oil or the like used in the cam groove. Thus, hunting at the time of driving control between the linear groove and the straight groove cam follower having a large gap therebetween can be suppressed, wear between the cam groove and the cam groove cam follower having a small gap therebetween can be reduced, and a rise in sliding resistance can be suppressed to thereby realize suitable driving control.

Figure 8:
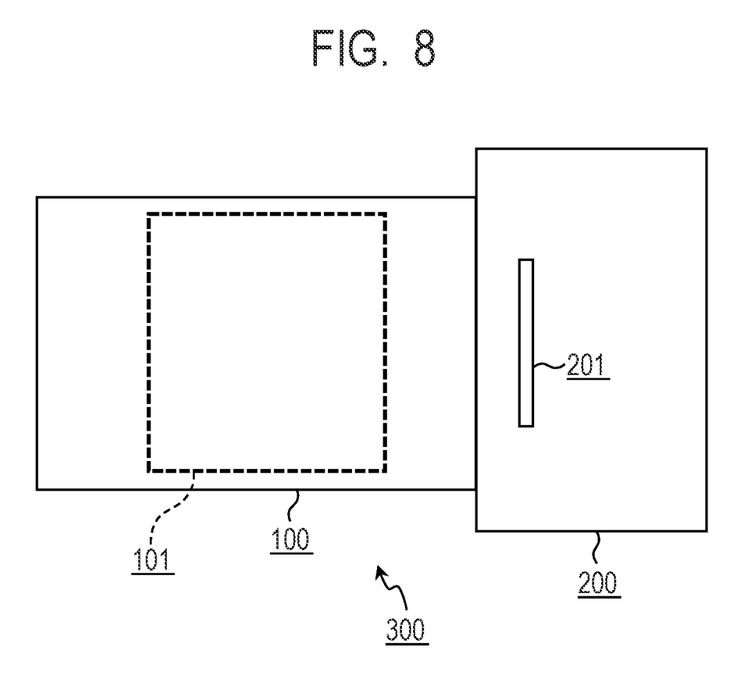
FIG. 8 shows an image pickup apparatus having a lens barrel of the present invention.

The lens apparatus to which the lens barrel of the embodiment is applied can realize the lens apparatus obtaining the effect of the present invention. An image pickup apparatus 300 (FIG. 8) having a lens apparatus 100 to which a lens barrel 101 of an embodiment is applied and a camera device 200 having an image pickup element 201 for picking up an image formed by the lens apparatus 100 can realize an image pickup device enjoying the effect of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-024938, filed Feb. 19, 2021, which is hereby incorporated by reference herein in its entirety.

What is claimed is:

1. A lens barrel comprising:
a linear guide member with a linear guide extending along an optical axis formed therein;
a cam member with a cam formed therein; and
a moving member holding an optical element, including an engaging member engaging with the linear guide and the cam, and moving along the optical axis by a relative rotation between the linear guide member and the cam member,
wherein the engaging member includes a first engaging member engaging with the cam, a second engaging member engaging with the linear guide and having a planar surface in rolling or sliding engagement with a planar surface of the linear guide through a viscous member arranged between the linear guide and the second engaging member, and an intermediate member provided between the first engaging member and the second engaging member, and
wherein an outer peripheral surface of the intermediate member engages with the first engaging member and an inner peripheral surface of the intermediate member engages with the second engaging member.

2. The lens barrel according to claim 1, wherein a portion of the first engaging member engaging with the cam is less rigid than a portion of the cam engaging with the first engaging member and a portion of the intermediate member engaging with the first engaging member is more rigid than the portion of the first engaging member engaging with the cam.

3. The lens barrel according to claim 2, wherein a portion of the first engaging member engaging with the cam comprises resin.

4. The lens barrel according to claim 1, wherein the viscous member comprises a lubricating oil or a grease.

5. The lens barrel according to claim 1,
wherein the moving member includes a holding member holding the first engaging member and the second engaging member; and
wherein the first engaging member and the second engaging member include constituent materials different from each other, respectively.

6. The lens barrel according to claim 1, further comprising a viscous member arranged between the cam and the first engaging member,
wherein a viscosity of the viscous member arranged between the linear guide and the second engaging member is higher than a viscosity of the viscous member arranged between the cam and the first engaging member.

7. The lens barrel according to claim 1, wherein an amount of gap between the first engaging member and the cam is smaller than an amount of gap in a circumferential direction between the second engaging member and the linear guide.

8. The lens barrel according to claim 7, wherein the amount of gap between the second engaging member and the linear guide is greater than zero and the amount of gap between the first engaging member and the cam is zero.

9. A lens apparatus comprising:
an optical element; and
a lens barrel which holds the optical element,
wherein the lens barrel comprises:
a linear guide member formed with a linear guide extending along an optical axis;
a cam member with a cam formed therein; and
a moving member, holding an optical element, including an engaging member engaging with the linear guide and the cam, and moving along the optical axis by a relative rotation between the linear guide member and the cam member,
wherein the engaging member includes a first engaging member engaging with the cam, a second engaging member engaging with the linear guide and having a planar surface in rolling or sliding engagement with a planar surface of the linear guide through a viscous member arranged between the linear guide and the second engaging member, and an intermediate member provided between the first engaging member and the second engaging member,
wherein an outer peripheral surface of the intermediate member engages with the first engaging member and an inner peripheral surface of the intermediate member engages with the second engaging member.

10. An image pickup apparatus comprising:
a lens apparatus; and
an image pickup element for picking up an image formed by the lens apparatus,
wherein the lens apparatus comprises:
an optical element; and
a lens barrel for holding the optical element, and
wherein the lens barrel comprises:
a linear guide member with a linear guide extending along an optical axis formed therein;
a cam member with a cam formed therein; and
a moving member holding an optical element, including an engaging member engaging with the linear guide and the cam, and moving along the optical axis by a relative rotation between the linear guide member and the cam member,
wherein the engaging member includes a first engaging member engaging with the cam, a second engaging member engaging with the linear guide and having a planar surface in rolling or sliding engagement with a planar surface of the linear guide through a viscous member arranged between the linear guide and the second engaging member, and an intermediate member provided between the first engaging member and the second engaging member, and
wherein an outer peripheral surface of the intermediate member engages with the first engaging member and an inner peripheral surface of the intermediate member engages with the second engaging member.

* * * * *